(12) United States Patent
Jesse et al.

(10) Patent No.: US 7,582,179 B2
(45) Date of Patent: Sep. 1, 2009

(54) EDGE BAND AND EDGE BANDING PROCESS

(75) Inventors: David Jesse, Grand Rapids, MI (US); Terry Luyk, Hudsonville, MI (US)

(73) Assignee: Steelcase Development Corporation, Caledonia, MI (US)

( * ) Notice: Subject to any disclaimer, the term of this patent is extended or adjusted under 35 U.S.C. 154(b) by 414 days.

(21) Appl. No.: 11/683,017

(22) Filed: Mar. 7, 2007

(65) Prior Publication Data
US 2007/0209746 A1    Sep. 13, 2007

Related U.S. Application Data

(62) Division of application No. 10/698,757, filed on Oct. 31, 2003, now Pat. No. 7,189,442.

(51) Int. Cl.
*B29C 65/54* (2006.01)
*B32B 37/26* (2006.01)
*B32B 38/10* (2006.01)

(52) U.S. Cl. ............... 156/247; 156/280; 156/304.5

(58) Field of Classification Search .............. 156/247, 156/278, 280, 304.5; 428/40.1, 41.6, 41.7, 428/41.8, 41.9, 42.1, 46, 50, 537.1, 906, 428/914; 52/389, 390
See application file for complete search history.

(56) References Cited

U.S. PATENT DOCUMENTS

| | | |
|---|---|---|
| 3,011,932 A | 12/1961 | Downing |
| 3,080,257 A | 3/1963 | Berry |
| 3,468,741 A | 9/1969 | Miller |
| 3,590,754 A | 7/1971 | Jakobsen |
| 3,753,832 A | 8/1973 | Veneziale, Jr. |
| 4,067,762 A | 1/1978 | Rhoads |
| 4,118,268 A | 10/1978 | Price |
| 4,193,830 A | 3/1980 | Milne |
| 4,222,812 A | 9/1980 | Duewel |
| 4,324,832 A | 4/1982 | Moroff et al. |
| 4,409,060 A | 10/1983 | Janssens |
| 4,517,228 A | 5/1985 | Matejka et al. |
| 4,543,765 A | 10/1985 | Barrett |
| 4,597,821 A | 7/1986 | Munro |
| 4,849,063 A | 7/1989 | McXinnon |
| 4,853,058 A | 8/1989 | Riesmeier et al. |
| 5,234,519 A | 8/1993 | Talbot et al. |

(Continued)

FOREIGN PATENT DOCUMENTS

EP    0510231    10/1992

(Continued)

*Primary Examiner*—Philip C Tucker
*Assistant Examiner*—Sing P Chan
(74) *Attorney, Agent, or Firm*—Rader, Fishman & Grauer, PLLC

(57) ABSTRACT

The present invention provides an edge band including a protective layer attached to a wood portion. The wood portion includes a first side and a second side. A first adhesive is disposed between the protective layer and the first side of the wood portion and a second adhesive is disposed on the second side of the wood portion and may be used to attach the edge band to an article. The protective layer can be removed from the band when desired, for example, following the application of a finishing material to the associated article.

18 Claims, 3 Drawing Sheets

U.S. PATENT DOCUMENTS

| | | |
|---|---|---|
| 5,480,680 A | 1/1996 | Vieyra |
| 5,512,323 A | 4/1996 | Beane et al. |
| 5,544,463 A | 8/1996 | Bergin |
| 5,554,429 A | 9/1996 | Iwata et al. |
| 5,635,248 A | 6/1997 | Hsu et al. |
| 5,660,678 A | 8/1997 | Parker, Jr. |
| 5,830,549 A | 11/1998 | Sweet et al. |
| 6,214,148 B1 | 4/2001 | Hill |
| 6,263,938 B1 | 7/2001 | Maioli et al. |
| 6,432,237 B1 | 8/2002 | Hasenkamp et al. |
| 6,467,522 B1 | 10/2002 | Durney et al. |
| 2002/0152957 A1 | 10/2002 | Pedigrew |

FOREIGN PATENT DOCUMENTS

| | | |
|---|---|---|
| EP | 0945235 | 9/1999 |
| EP | 0945235 | 2/2003 |
| WO | 85/01009 | 3/1985 |
| WO | 01/07152 | 2/2001 |
| WO | 02/062542 | 8/2002 |
| WO | 02/094518 | 11/2002 |

EDGE BAND AND EDGE BANDING PROCESS

CROSS-REFERENCE TO RELATED APPLICATIONS

The present application is a Divisional application of U.S. patent application Ser. No. 10/698,757, filed Oct. 31, 2003 now U.S. Pat. No. 7,189,442, the entirety of which is incorporated by reference herein.

FIELD OF THE INVENTION

The present invention relates to an edge band and an edge banding process for a work piece, including an edge band and an edge banding pre-treatment process for a wooden object that reduces the amount of processing required to manufacture the object.

BACKGROUND OF THE INVENTION

Conventional wooden items such as case furniture, desks, bookcases, file cabinets or other similar products are constructed of veneered particle board, plywood or other non-aesthetically pleasing composite wood materials. The surface of such articles is commonly treated with a finishing process to make the finished article appear as though it is constructed of solid wood. The finishing process typically includes applying a finishing material, which comprises paint or other suitable coating that has a solid wood or wood-like appearance, to a surface of the product. An edge band material is sometimes applied to the thin sides or edges of these products so that the edges also appear to be a part of a consistent wood or wood-like item. Like the finishing material, the edge band also has a wood-like appearance.

A typical edge band comprises a roll of strip-like material that is commonly a compilation of wood material from a variety of different trees. The material is processed into thin strips and wound on rolls. The rolls are then loaded onto edge banding machines, which are used to then apply the edge band to the edge portions of wooden products. Generally, the edge band is applied to the edge surfaces of wooden product before other finish materials are applied. After the edge band has been applied, the finish material is disposed over portions of the product's surface, including at least a partial covering of the edge band. Then, the finish material, which is often extensively supplied, is removed from portions of the edge band by sanding or other suitable means.

Often portions of the finish material are removed from the edge band material after each application to the product. This results in increased labor, especially if the finished material is applied to the wood product multiple times on multiple surfaces. Additionally, as the edge band material may be formed from numerous different wood sources, the colors along the length of the edge band can perceptively vary and thereby provide a less aesthetically pleasing appearance. The present invention was developed in light of these and other drawbacks.

BRIEF SUMMARY OF THE INVENTION

The present invention provides an edge band including a protective layer attached to a wood portion. The wood portion includes a first side and a second side. A first adhesive is disposed between the protective layer and the first side of the wood portion and a second adhesive is disposed on the second side of the wood portion and may be used to attach the edge band to an article. The protective layer can be removed from the band when desired, for example, following the application of a finishing material to the associated article. Other aspects of the invention will be apparent to those skilled in the art after reviewing the drawings and the detailed description below.

BRIEF DESCRIPTION OF THE DRAWINGS

The present invention will now be described, by way of example, with reference to the accompanying drawings, in which.

DETAILED DESCRIPTION OF THE INVENTION

Figure 1:
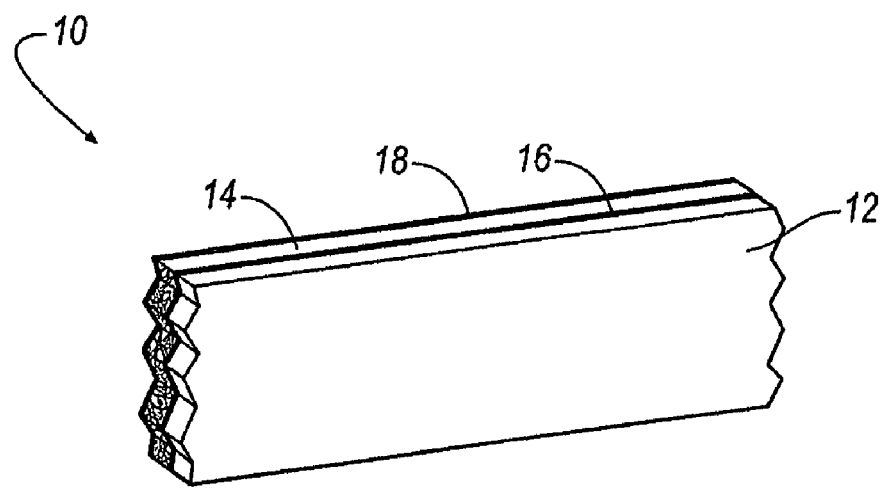
FIG. 1 is a perspective view of a portion of an edge band according to an embodiment of the present invention.

Referring now to FIG. 1, a portion of an illustrative edge band 10 is shown and described. Edge band 10 includes a protective layer 12 attached to a wood portion 14. The wooden portion 14 includes a first side and a second side. The protective layer 12 serves, at least in part, to protect a side of the wood portion 14. In an embodiment of the invention, the protective layer 12 is comprised, at least in part, of a plastic or paper-based material. By way of example, without limitation, the protective layer 12 can be comprised of commercially available films, such as 3M's SCOTCH brand number 218HD3022-04, or sheets. One skilled in the art, however, will recognize that the protective layer 12 can be formed of various other suitable materials as well.

A first adhesive material 16 is disposed between the protective layer 12 and the first side of the wood portion 14 to "attach" the wood portion 14 to the protective layer 12. As used herein the term "attach" means to attach, bond, adhere, or otherwise merge or connect a portion or a substantial portion of separate components. The first adhesive material 16 can, among other things, be comprised of a suitable adhesive to attach the protective layer 12 to the wood portion 14. However, the first adhesive material 16 preferably has attachment characteristics that allow the protective layer 12 to attach sufficiently to the edge band 10 so as to be able to withstand application onto a component, such as by an edge banding machine, while permitting the protective layer 12 to be peeled away and removed from the wood portion 14 some time after a finishing material has been applied to the component or product (a process described in greater detail hereinafter).

A second adhesive material 18 is disposed on the second, opposite side of the wood portion 14 from the protective layer 12. In an embodiment of the invention, the first adhesive material 16 exhibits a weaker, less permanent adhesive force than the second adhesive material 18. Consequently, when the edge band 10 is attached to an article at least in part by the second adhesive material 18, the protective layer 12 can be removed (e.g., pulled away) from the wood portion 14 without causing the wood portion 14 to be unacceptably pulled or torn from the surface of the article to which the edge band 10 is attached. The wood portion 14 can be constructed of any suitable material, including those conventionally used for edge banding, as will be readily understood by one skilled in the art.

In an embodiment of the invention, the wood portion 14 may be treated (or pre-treated) with a sap stain. The stain may include a pigment (such as a white and yellow pigment) that helps to neutralize the color of the grain of wood. The stain may additionally serve to better lock down the grain fibers to prevent the finish from raising the fibers. This "lockdown" feature is particularly useful when a water-based finishing material is material employed because water-based finishes are known to sometimes cause fibers of wood to rise.

Figure 2:
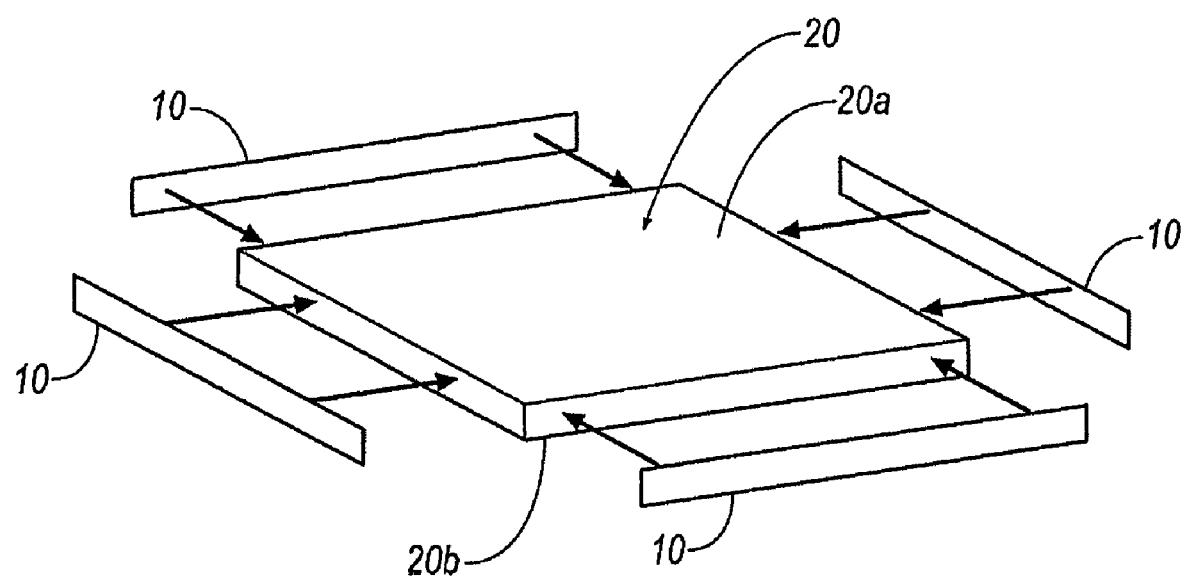
FIG. 2 is a perspective exploded view of a work piece and several edge bands according to an embodiment of the present invention.
Figure 2A:
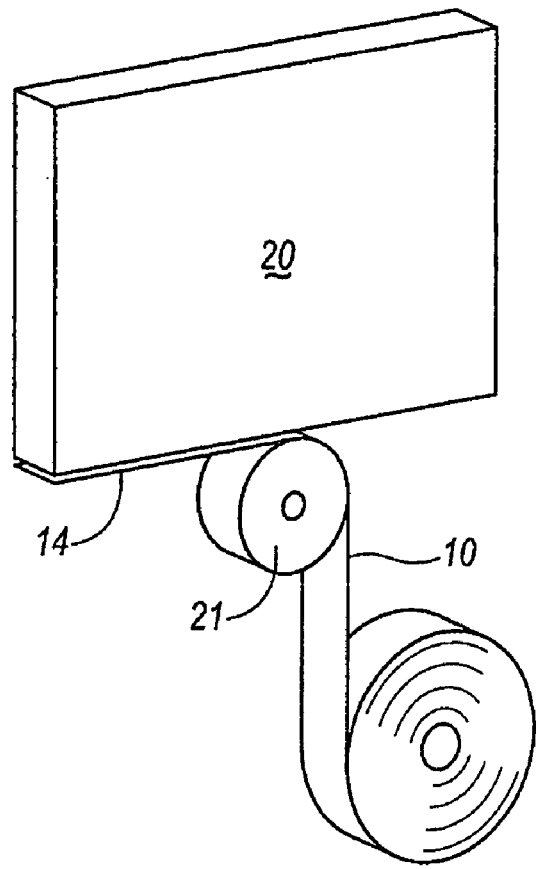
FIG. 2A is general illustration of a roller applying an edge band to an edge portion of an article.

With reference to FIG. 2, the edge band 10 is shown being applied to edges of a work piece 20. FIG. 2A schematically illustrates an edge band 10 supplied from roll that is applied by a roller 21 to an edge surface of a work piece 20. A suitable means for cutting or severing the band 10 (not shown) can be employed as desired or necessary. The illustrated work piece 20 is a fairly generic example of a component that may be included as a part of a wood-type article such as shelves, bookcases, work surfaces, or any other suitable items. The work piece 20 may, for example, be comprised of a less aesthetically pleasing material, such as plywood or particle board. Of course, persons skilled in the art will readily understand that the work piece 20 may be of any suitable configuration and may be made of other suitable materials in addition to those described herein. The second adhesive material 18 is disposed on the side of edge band 10 that is proximate the edges of the work piece 20, in this case, as generally depicted in FIG. 2, at the edges pointed to by the directional arrows. In this way, the second adhesive material can—at least in part—attach significant portions of the edge band 10 to the work piece 20 and leave the protective layer 12 exposed to the external environment.

Figure 3:
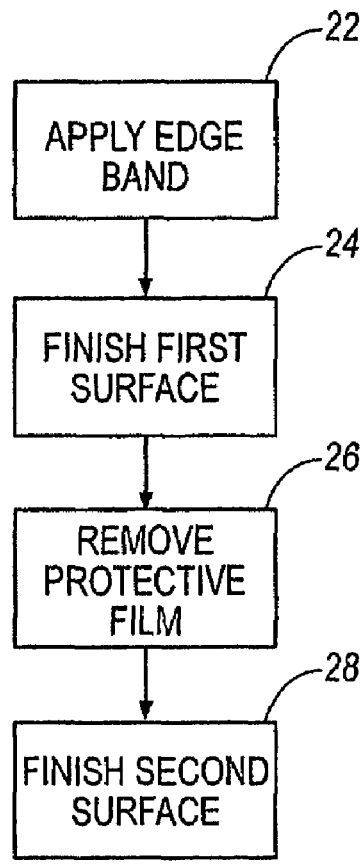
FIG. 3 is a flow chart outlining a process for applying an edge band to a work piece according to an embodiment of the present invention.

Referring next to FIG. 3, a flow chart outlining a process for applying an edge band 10 to a work piece 20 is described in greater detail. FIG. 3 generally presents a sequence of individual steps form an embodiment of the invention that relates to applying the edge band 10 to the work piece 20 and then finishing the work piece 20. The work piece 20 is commonly finished by applying a material, such as a stain or paint, to one or more surfaces of a work piece 20 that, among other things may protect the surface of the work piece 20 and/or cause the surface to appear to be created from a more consistent portion of solid wood.

The exemplary process begins with step 22, in which an edge band 10 is applied to a work piece 20 by attaching, bonding, or otherwise adhering the edge band 10 to a portion (such as an edge) of the work piece 20. The connection of the edge band 10 to the work piece 20 is done, at least in part, via a second adhesive material 18. Next, in step 24, a surface (e.g., surface 20a—see FIG. 2) is finished by applying a finish material, which may include a paint, stain or the like over the surface 20a. With a typically application of the finish material, at least a portion of the band, and more commonly a portion of the outer (protective layer) surface of edge band 10, will also receive a portion of the applied material. This process of applying the finishing material can, to the extent desired, be carried out in accordance with methods readily known to one skilled in the art.

Figure 5:
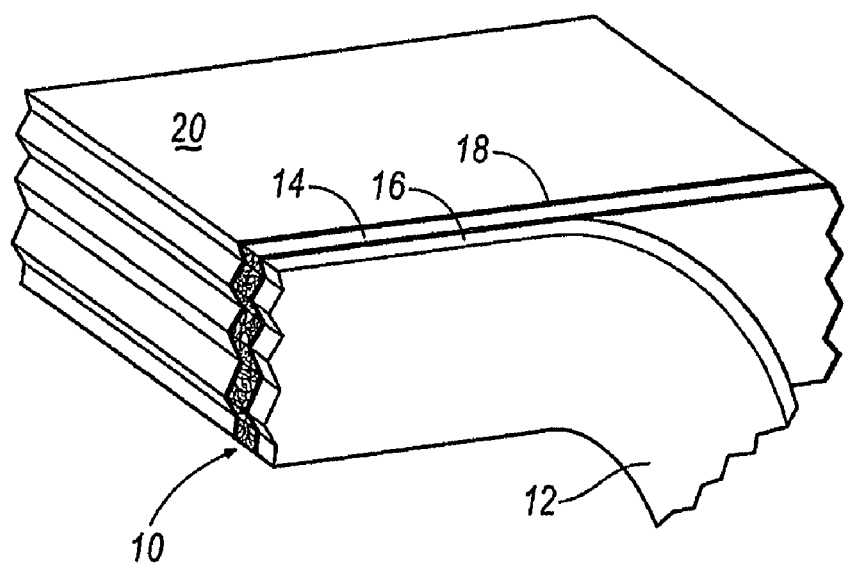
FIG. 5 is a perspective view of a portion of an article and an edge band according to an embodiment of the present invention.

Next, in step 26, the protective layer 12 is removed from the wood portion 14. FIG. 5 generally illustrates the removal of a portion of a protective layer 12 that has previously been attached to an article 20. The protective layer 12 can be removed by grabbing one edge of the protective layer 12, and then pulling the protective layer 12 to detach the protective layer 12 from the work piece 20, or, in some embodiments, may be scraped or erased. One skilled in the art will readily recognize other methods for removing protective layer 12 as well. Next, in step 28, a second surface 20b may be finished in a similar manner as the first surface. Specifically, a finishing material can be applied to the second surface 20b and, similarly, may also be applied to the now uncovered wood portion 14, which is uncovered by virtue of removal of the protective layer 12. As before, the finishing material applied to the second surface 20b can be used to make the second surface 20b and the wood portion 14 appear to be a part of a more solid-type of object.

In instances in which a first pass finish coat is applied, the protective layer 12 can be removed from the edge band 10. Because the layer of protective layer 12 substantially protects the edge banding during the first pass of a two-pass finish coating process, an additional sanding or removal step is eliminated because the finish from the first side flat line does not generally touch the wood portion 14 of the edge band 10 and therefore does not need to be sanded off. However, in some cases, some minor touch-up or sanding may be employed after the film 12 is removed because a small portion of the grain is pulled or a bit of adhesive remains. In those instances, if desired, the surface can commonly be touched up relatively easily, and certainly more easily than removal of a first side flat line finish. For example, instead of employing the more common and complicated and capital intensive technique of running an orbital sander over the surface, a simple, quick block sanding technique may be sufficient.

As discussed above, the first adhesive material 16 attaches to a lesser degree than the second adhesive material 18. Accordingly, the protective layer 12 can be removed from the wood portion 14 without substantially adversely affecting or removing the wood portion 14 from the work piece 20. By removing the protective layer 12, the finish material disposed thereon is quickly and easily removed without requiring sanding or other labor intensive means of removal.

Figure 4:
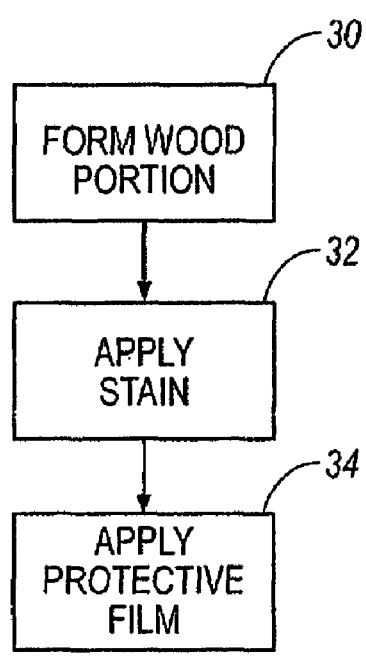
FIG. 4 is a flow chart outlining a process for forming an edge band according to an embodiment of the present invention.

FIG. 4 includes a flow chart outlining a process for forming an edge band 10. The process generally includes the steps of forming the wood portion 14, applying a sap stain to a wood portion 14, and then applying a protective layer 12 over the wood portion 14. Specifically, in step 30, the wood portion 14 can be formed by means generally known in the art such as by combining wood from a plurality of wood sources into a thin strip-like material. As discussed in previous sections, these multiple wood sources may result in the wood portion 14 having varying colors along its length, which may be less aesthetically pleasing in appearance. Next, in step 32, the wood portion 14 is treated with a stain. As discussed above, a sap stain—that may be formed of a white and yellow pigment or other pigment—can be used to help neutralize the color of the grain of the wood portion and lock down the grain fibers of the wood portion 14. By locking down the wood fibers of the wood portion 14, undesired raising of wood in the wood portion 14 can be prevented or reduced, especially if the finish is a water-based finish, is prevented. In step 34, the protective layer 12 is applied to the wood portion 14, first adhesive 16 being used to attach the film 12 to the wood portion as previously discussed.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. A method for finishing an article, comprising:
providing an article having a first surface, a second surface, and at least an edge portion connecting the first surface and the second surface;
providing an edge band, comprising:
a protective layer;
a wood portion including a first side and a second side;
a first adhesive disposed between the protective layer and the first side of the wood portion to connect the protective layer to the wood portion; and
a second adhesive disposed on the second side of the wood portion;
attaching the edge band to the edge portion;
applying a finish material to the first surface of the article; and
removing the protective layer and the first adhesive from the wood portion.

2. A method as recited in claim 1, including applying a finish material to the second surface of the article.

3. A method as recited in claim 2, wherein the edge portion is finished with the second surface.

4. A method as recited in claim 2, wherein the finish is applied to the first surface prior to the removal of the protective layer.

5. A method as recited in claim 4, wherein the finish is applied to the second surface after the removal of the protective layer.

6. A method as recited in claim 1, wherein the first adhesive forms a weaker attachment with the wood portion than the second adhesive material forms with the wood portion.

7. A method as recited in claim 1, wherein the wood portion includes a stain.

8. A method as recited in claim 1, wherein the protective layer is comprised of plastic.

9. A method as recited in claim 1, wherein the step of providing an edge band further comprises forming an edge band, comprising the steps of:
forming a wood portion from a plurality of sources of wood, the wood portion including a first side and a second side;
applying a stain to the wood portion;
attaching a protective layer to the first side of the wood portion with a first adhesive; and
applying a second adhesive to the second side of the wood portion.

10. A method as recited in claim 9, wherein the first adhesive forms a weaker attachment to the wood portion than the second adhesive.

11. A method as recited in claim 9, wherein the protective layer is comprised of plastic.

12. A method for minimizing the buildup of finishing material on a two-sided, veneered object, including:
providing an article with first and second spaced apart surfaces and an intermediate surface therebetween;
providing an edge band comprising a protective layer and a veneer, and applying said edge band to the intermediate surface;
finishing the first surface in a first pass;
removing the protective layer; and
finishing the second surface and the veneer in a second pass.

13. A method as recited in claim 12, wherein the intermediate surface is an edge.

14. A method as recited in claim 12, wherein the protective layer includes a plastic or paper-based material.

15. A method as recited in claim 14, wherein the protective layer is provided on a roll of veneer.

16. A method as recited in claim 14, including the step of flipping or turning the object between finishing steps.

17. A method as recited in claim 14, wherein the veneer includes a wood portion.

18. A method for minimizing the buildup of finishing material on a two-sided, veneered object, including:
providing an article with first and second spaced apart surfaces and an intermediate surface therebetween;
providing an edge band comprising a protective layer and a veneer, the protective layer including a plastic or paper-based material; wherein the edge band is applied to the intermediate surface;
finishing the first surface in a first pass;
finishing the second surface in a second pass; and
removing the protective layer after the second pass.

* * * * *